(12) United States Patent
Fontoura et al.

(10) Patent No.: US 8,655,888 B2
(45) Date of Patent: *Feb. 18, 2014

(54) SEARCHING DOCUMENTS FOR RANGES OF NUMERIC VALUES

(75) Inventors: Marcus F. Fontoura, San Jose, CA (US); Ronny Lempel, Haifa (IL); Runping Qi, Cupertino, CA (US); Jason Y. Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,634

(22) Filed: Dec. 22, 2011

(65) Prior Publication Data

US 2012/0096016 A1 Apr. 19, 2012

Related U.S. Application Data

(63) Continuation of application No. 12/190,495, filed on Aug. 12, 2008, now Pat. No. 8,271,498, which is a continuation of application No. 10/949,473, filed on Sep. 24, 2004, now Pat. No. 7,461,064.

(51) Int. Cl.
*G06F 7/00* (2006.01)

(52) U.S. Cl.
USPC ............................................ 707/742; 707/715

(58) Field of Classification Search
USPC .................................................. 707/715, 742
See application file for complete search history.

(56) References Cited

U.S. PATENT DOCUMENTS

| | | | |
|---|---|---|---|
| 4,965,763 A | 10/1990 | Zamora |
| 5,187,790 A | 2/1993 | East et al. |
| 5,265,221 A | 11/1993 | Miller |
| 5,287,496 A | 2/1994 | Chen et al. |
| 5,297,039 A | 3/1994 | Kanaegami et al. |

(Continued)

FOREIGN PATENT DOCUMENTS

| | | |
|---|---|---|
| EP | 0809197 | 11/1997 |
| JP | 10289246 | 10/1997 |

(Continued)

OTHER PUBLICATIONS

Patent Abstract for JP10289246, published Oct. 27, 1998, Total 1 p.

(Continued)

*Primary Examiner* — Cheyne D Ly
(74) *Attorney, Agent, or Firm* — David W. Victor; Konrad, Raynes, Davda & Victor LLP

(57) ABSTRACT

Provided are a method, system, and article of manufacture for searching documents for ranges of numeric values. Document identifiers for documents are accessed, wherein the documents include at least one value that is a member of a set of values. A number of posting lists are generated. Each posting list is associated with a range of consecutive values within the set of values and includes document identifiers for documents including at least one value within the range of consecutive values associated with the posting list, and wherein each document identifier is associated with one value in the set of values included in the document identified by the document identifier. The generated posting lists are stored, wherein the posting lists are used to process a query on a range of values within the set of values.

22 Claims, 7 Drawing Sheets

(56) References Cited

U.S. PATENT DOCUMENTS

| | | |
|---|---|---|
| 5,423,032 A | 6/1995 | Byrd et al. |
| 5,574,906 A | 11/1996 | Morris |
| 5,638,543 A | 6/1997 | Pedersen et al. |
| 5,664,172 A | 9/1997 | Antoshenkov |
| 5,685,003 A | 11/1997 | Peltonen et al. |
| 5,701,469 A | 12/1997 | Brandli et al. |
| 5,708,825 A | 1/1998 | Sotomayor |
| 5,721,938 A | 2/1998 | Stuckey |
| 5,721,939 A | 2/1998 | Kaplan |
| 5,724,033 A | 3/1998 | Burrows |
| 5,729,730 A | 3/1998 | Wlaschin et al. |
| 5,745,889 A | 4/1998 | Burrows |
| 5,745,890 A | 4/1998 | Burrows |
| 5,745,894 A | 4/1998 | Burrows et al. |
| 5,745,898 A | 4/1998 | Burrows |
| 5,745,899 A | 4/1998 | Burrows |
| 5,745,900 A | 4/1998 | Burrows |
| 5,745,904 A | 4/1998 | King et al. |
| 5,745,906 A | 4/1998 | Squibb |
| 5,756,150 A | 5/1998 | Mori et al. |
| 5,765,149 A | 6/1998 | Burrows |
| 5,765,158 A | 6/1998 | Burrows |
| 5,765,168 A | 6/1998 | Burrows |
| 5,778,378 A | 7/1998 | Rubin |
| 5,787,435 A | 7/1998 | Burrows |
| 5,797,008 A | 8/1998 | Burrows |
| 5,809,502 A | 9/1998 | Burrows |
| 5,832,480 A | 11/1998 | Byrd, Jr. et al. |
| 5,832,500 A | 11/1998 | Burrows |
| 5,832,519 A | 11/1998 | Bowen et al. |
| 5,848,407 A | 12/1998 | Ishikawa et al. |
| 5,852,820 A | 12/1998 | Burrows |
| 5,862,325 A | 1/1999 | Reed et al. |
| 5,864,863 A | 1/1999 | Burrows |
| 5,873,097 A | 2/1999 | Harris et al. |
| 5,884,305 A | 3/1999 | Kleinberg et al. |
| 5,890,103 A | 3/1999 | Carus |
| 5,893,119 A | 4/1999 | Squibb |
| 5,903,646 A | 5/1999 | Rackman |
| 5,903,891 A | 5/1999 | Chen et al. |
| 5,903,901 A | 5/1999 | Kawakura et al. |
| 5,909,677 A | 6/1999 | Broder et al. |
| 5,914,679 A | 6/1999 | Burrows |
| 5,915,251 A | 6/1999 | Burrows et al. |
| 5,920,859 A | 7/1999 | Li |
| 5,924,091 A | 7/1999 | Burkhard |
| 5,933,822 A | 8/1999 | Braden-Harder et al. |
| 5,963,940 A | 10/1999 | Liddy et al. |
| 5,963,954 A | 10/1999 | Burrows |
| 5,966,703 A | 10/1999 | Burrows |
| 5,966,710 A | 10/1999 | Burrows |
| 5,970,497 A | 10/1999 | Burrows |
| 5,974,412 A | 10/1999 | Hazlehurst et al. |
| 5,995,980 A | 11/1999 | Olson et al. |
| 6,005,503 A | 12/1999 | Burrows |
| 6,016,493 A | 1/2000 | Burrows |
| 6,016,501 A | 1/2000 | Martin et al. |
| 6,021,409 A | 2/2000 | Burrows |
| 6,026,388 A | 2/2000 | Liddy et al. |
| 6,026,413 A | 2/2000 | Challenger et al. |
| 6,029,165 A | 2/2000 | Gable |
| 6,035,268 A | 3/2000 | Carus et al. |
| 6,047,286 A | 4/2000 | Burrows |
| 6,067,543 A | 5/2000 | Burrows |
| 6,078,914 A | 6/2000 | Redfern |
| 6,078,916 A | 6/2000 | Culliss |
| 6,078,923 A | 6/2000 | Burrows |
| 6,088,694 A | 7/2000 | Burns et al. |
| 6,105,019 A | 8/2000 | Burrows |
| 6,119,124 A | 9/2000 | Broder et al. |
| 6,122,626 A | 9/2000 | Brandsma |
| 6,182,062 B1 | 1/2001 | Fujisawa et al. |
| 6,182,121 B1 | 1/2001 | Wlaschin |
| 6,192,258 B1 | 2/2001 | Kamada et al. |
| 6,192,333 B1 | 2/2001 | Pentheroudakis |
| 6,205,451 B1 | 3/2001 | Norcott et al. |
| 6,205,456 B1 | 3/2001 | Nakao |
| 6,216,175 B1 | 4/2001 | Sliger et al. |
| 6,233,571 B1 | 5/2001 | Egger et al. |
| 6,243,713 B1 | 6/2001 | Nelson et al. |
| 6,243,718 B1 | 6/2001 | Klein et al. |
| 6,269,361 B1 | 7/2001 | Davis et al. |
| 6,278,992 B1 | 8/2001 | Curtis et al. |
| 6,285,999 B1 | 9/2001 | Page |
| 6,295,529 B1 | 9/2001 | Corston-Oliver et al. |
| 6,308,179 B1 | 10/2001 | Petersen et al. |
| 6,324,566 B1 | 11/2001 | Himmel et al. |
| 6,336,112 B2 | 1/2002 | Chakrabarti et al. |
| 6,336,117 B1 | 1/2002 | Massarani |
| 6,336,122 B1 | 1/2002 | Lee et al. |
| 6,339,772 B1 | 1/2002 | Klein et al. |
| 6,349,308 B1 * | 2/2002 | Whang et al. ........................ 1/1 |
| 6,374,268 B1 | 4/2002 | Testardi |
| 6,381,602 B1 | 4/2002 | Shoroff et al. |
| 6,385,616 B1 | 5/2002 | Gardner |
| 6,418,433 B1 | 7/2002 | Chakrabarti et al. |
| 6,421,655 B1 | 7/2002 | Horvitz et al. |
| 6,457,018 B1 | 9/2002 | Rubin |
| 6,463,439 B1 | 10/2002 | Dahlberg |
| 6,507,846 B1 | 1/2003 | Consens |
| 6,519,592 B1 | 2/2003 | Getchius et al. |
| 6,519,593 B1 | 2/2003 | Matias et al. |
| 6,519,597 B1 | 2/2003 | Cheng et al. |
| 6,529,285 B2 | 3/2003 | Bobrow et al. |
| 6,542,906 B2 | 4/2003 | Korn |
| 6,547,829 B1 | 4/2003 | Meyerzon et al. |
| 6,553,385 B2 | 4/2003 | Johnson et al. |
| 6,567,804 B1 | 5/2003 | Ramasamy et al. |
| 6,578,032 B1 | 6/2003 | Chandrasekar et al. |
| 6,584,458 B1 | 6/2003 | Millett et al. |
| 6,594,682 B2 | 7/2003 | Peterson et al. |
| 6,615,209 B1 | 9/2003 | Gomes et al. |
| 6,618,725 B1 | 9/2003 | Fukuda et al. |
| 6,622,211 B2 | 9/2003 | Henry et al. |
| 6,631,369 B1 | 10/2003 | Meyerzon et al. |
| 6,631,496 B1 | 10/2003 | Li et al. |
| 6,633,872 B2 | 10/2003 | Ambrosini et al. |
| 6,643,650 B1 | 11/2003 | Slaughter et al. |
| 6,658,406 B1 | 12/2003 | Mazner et al. |
| 6,658,423 B1 | 12/2003 | Pugh et al. |
| 6,665,657 B1 | 12/2003 | Dibachi |
| 6,665,666 B1 | 12/2003 | Brown et al. |
| 6,678,409 B1 | 1/2004 | Wu et al. |
| 6,754,873 B1 | 6/2004 | Law et al. |
| 6,763,362 B2 | 7/2004 | McKeeth |
| 6,766,316 B2 | 7/2004 | Caudill et al. |
| 6,789,077 B1 | 9/2004 | Slaughter et al. |
| 6,810,375 B1 | 10/2004 | Ejerhed |
| 6,839,665 B1 | 1/2005 | Meyers |
| 6,839,702 B1 | 1/2005 | Patel et al. |
| 6,839,843 B1 | 1/2005 | Bacha et al. |
| 6,842,730 B1 | 1/2005 | Ejerhed et al. |
| 6,845,009 B1 | 1/2005 | Whitted |
| 6,850,979 B1 | 2/2005 | Saulpaugh et al. |
| 6,865,575 B1 | 3/2005 | Smith et al. |
| 6,868,447 B1 | 3/2005 | Slaughter et al. |
| 6,870,095 B1 | 3/2005 | Whitted |
| 6,877,136 B2 | 4/2005 | Bess et al. |
| 6,904,454 B2 | 6/2005 | Stickler |
| 6,906,920 B1 | 6/2005 | Whitted |
| 6,934,634 B1 | 8/2005 | Ge |
| 7,031,954 B1 | 4/2006 | Kirsch |
| 7,051,023 B2 | 5/2006 | Kapur et al. |
| 7,243,301 B2 | 7/2007 | Bargeron et al. |
| 7,293,005 B2 | 11/2007 | Fontoura et al. |
| 7,318,075 B2 | 1/2008 | Ashwin et al. |
| 7,693,824 B1 | 4/2010 | Diament |
| 2001/0027451 A1 | 10/2001 | Taguchi et al. |
| 2001/0049671 A1 | 12/2001 | Joerg |
| 2002/0006112 A1 | 1/2002 | Jaber et al. |
| 2002/0032677 A1 | 3/2002 | Morgenthaler et al. |
| 2002/0032705 A1 | 3/2002 | Higashiyama et al. |
| 2002/0065957 A1 | 5/2002 | Rubin |
| 2002/0099723 A1 | 7/2002 | Garcia-Chiesa |

(56) References Cited

U.S. PATENT DOCUMENTS

| | | |
|---|---|---|
| 2002/0120685 A1 | 8/2002 | Srivastava et al. |
| 2002/0129014 A1 | 9/2002 | Kim et al. |
| 2002/0129015 A1 | 9/2002 | Caudill et al. |
| 2002/0165707 A1 | 11/2002 | Call |
| 2002/0169770 A1 | 11/2002 | Kim et al. |
| 2002/0174149 A1 | 11/2002 | Conroy et al. |
| 2002/0188615 A1 | 12/2002 | Latarche et al. |
| 2003/0028564 A1 | 2/2003 | Sanfilippo |
| 2003/0046311 A1 | 3/2003 | Baidya et al. |
| 2003/0055626 A1 | 3/2003 | Miyahira et al. |
| 2003/0093409 A1 | 5/2003 | Weil et al. |
| 2003/0163454 A1 | 8/2003 | Jacobsen et al. |
| 2003/0177127 A1 | 9/2003 | Goodwin et al. |
| 2003/0182282 A1 | 9/2003 | Ripley |
| 2003/0187833 A1 | 10/2003 | Plu |
| 2003/0217052 A1 | 11/2003 | Rubenczyk et al. |
| 2003/0225763 A1 | 12/2003 | Guilak et al. |
| 2003/0225779 A1 | 12/2003 | Matsuda |
| 2003/0229604 A1 | 12/2003 | Zaragoza et al. |
| 2004/0044962 A1 | 3/2004 | Green et al. |
| 2004/0078356 A1 | 4/2004 | Mazner et al. |
| 2004/0078387 A1 | 4/2004 | Benjamin et al. |
| 2004/0078753 A1 | 4/2004 | Doyle |
| 2004/0098399 A1 | 5/2004 | Risberg et al. |
| 2004/0111408 A1 | 6/2004 | Caudill et al. |
| 2004/0123104 A1 | 6/2004 | Boyen et al. |
| 2004/0128615 A1* | 7/2004 | Carmel et al. .............. 715/513 |
| 2004/0162997 A1 | 8/2004 | Hopmann et al. |
| 2004/0215606 A1 | 10/2004 | Cossock |
| 2004/0230598 A1 | 11/2004 | Robertson et al. |
| 2004/0243554 A1 | 12/2004 | Broder et al. |
| 2004/0243556 A1 | 12/2004 | Ferrucci et al. |
| 2004/0243557 A1 | 12/2004 | Broder et al. |
| 2004/0243560 A1 | 12/2004 | Broder et al. |
| 2004/0243581 A1 | 12/2004 | Weissman et al. |
| 2004/0243645 A1 | 12/2004 | Broder et al. |
| 2005/0033745 A1 | 2/2005 | Wiener et al. |
| 2005/0044411 A1 | 2/2005 | Somin et al. |
| 2005/0120004 A1 | 6/2005 | Stata et al. |
| 2005/0144241 A1 | 6/2005 | Stata et al. |
| 2005/0149499 A1 | 7/2005 | Franz et al. |
| 2005/0149576 A1 | 7/2005 | Marmaros et al. |
| 2005/0149851 A1 | 7/2005 | Mittal |
| 2005/0165781 A1 | 7/2005 | Kraft et al. |
| 2005/0165800 A1 | 7/2005 | Fontoura et al. |
| 2005/0165838 A1 | 7/2005 | Fontoura et al. |
| 2005/0198076 A1 | 9/2005 | Stata et al. |
| 2006/0047825 A1 | 3/2006 | Steenstra et al. |
| 2006/0074962 A1 | 4/2006 | Fontoura et al. |
| 2006/0129538 A1 | 6/2006 | Baader et al. |
| 2007/0016583 A1 | 1/2007 | Lempel et al. |
| 2007/0198456 A1 | 8/2007 | Betz et al. |
| 2007/0271268 A1 | 11/2007 | Fontoura et al. |
| 2007/0282829 A1 | 12/2007 | Fontoura et al. |
| 2008/0294634 A1 | 11/2008 | Fontoura et al. |
| 2008/0301130 A1 | 12/2008 | Fontoura et al. |
| 2009/0083270 A1 | 3/2009 | Kraft et al. |

FOREIGN PATENT DOCUMENTS

| | | |
|---|---|---|
| JP | 9311870 A | 12/1997 |
| JP | 10293767 | 11/1998 |
| JP | 2000339309 | 12/2000 |
| JP | 2002163276 | 6/2002 |
| WO | 9749048 | 12/1997 |

OTHER PUBLICATIONS

Patent Abstract for JP10293767, published Nov. 4, 1998, Total 1 p.
Patent Abstract for JP2000339309, published Dec. 8, 2000, Total 1 p.
Tomasic, A., H. Garcia-Molina, and K. Shoens, "Incremental Updates of Inverted Lists for Text Document Retrieval", Nov. 18, 1993, Total 43 pp.
First Office Action, Dec. 28, 2007, for EP05701609.9, Total 6 pp.
Amendment 1, May 21, 2007 for U.S. Appl. No. 10/949,473, filed Sep. 24, 2004 by M.F. Fontoura et al., Total 28 pp.
Amendment 1, Mar. 1, 2011, for U.S. Appl. No. 12/190,495, filed Aug. 12, 2008 by M.F. Fontoura et al., Total 11 pp.
Amendment 1, Mar. 17, 2011, for U.S. Appl. No. 12/187,344, filed Aug. 6, 2008 by M.F. Fontoura et al., Total 11 pp.
Amendment 2, Oct. 10, 2007, for U.S. Appl. No. 10/949,473, filed Sep. 24, 2004 by M.F. Fontoura et al., Total 21 pp.
Amendment 3, Mar. 21, 2008, for U.S. Appl. No. 10/949,473, filed Sep. 24, 2004 by M.F. Fontoura et al., Total 15 pp.
Final Office Action 1, Aug. 7, 2007, for U.S. Appl. No. 10/949,473, filed Sep. 24, 2004 by M.F. Fontoura et al., Total 49 pp.
Final Office Action 2, May 12, 2011, for U.S. Appl. No. 12/190,495, filed Aug. 12, 2008 by M.F. Fontoura et al., Total 18 pp.
Notice of Allowance 1, Jul. 8, 2008, for U.S. Appl. No. 10/949,473, filed Sep. 24, 2004 by M.F. Fontoura et al., Total 20 pp.
Notice of Allowance 1, Jun. 20, 2011, for U.S. Appl. No. 12/187,344, filed Aug. 6, 2008 by M.F. Fontoura et al., Total 20 pp.
Notice of Non-Compliant Amendment, May 29, 2007, for U.S. Appl. No. 10/949,473, filed Sep. 24, 2004 by M.F. Fontoura et al., Total 2 pp.
Office Action 1, Feb. 21, 2007, for U.S. Appl. No. 10/949,473, filed Sep. 24, 2004 by M.F. Fontoura et al., Total 42 pp.
Office Action 1, Jan. 5, 2011, for U.S. Appl. No. 12/187,344, filed Aug. 6, 2008 by M.F. Fontoura et al., Total 45 pp.
Office Action 1, Dec. 1, 2010, for U.S. Appl. No. 12/190,495, filed Aug. 12, 2008 by M.F. Fontoura et al., Total 54 pp.
Response to Notice of Non-Compliant Amendment, Jun. 13, 2007, for U.S. Appl. No. 10/949,473, filed Sep. 24, 2004 by M.F. Fontoura et al., Total 10 pp.
Final Office Action 2, Sep. 21, 2011, for U.S. Appl. No. 12/190,495, filed Aug. 12, 2008 by M.F. Fontoura et al., Total 13 pp.
Notice of Allowance 1, Nov. 28, 2011, for U.S. Appl. No. 12/190,495, filed Aug. 12, 2008 by M.F. Fontoura et al., Total 14 pp.
Agrawal, S., S Chaudhuri and G. Das, "DBXplorer: A System for Keyword-Based Search over Relational Databases," Proceedings of 18th International Conference on Data Engineering, 2002, 12 pp.
Agrawal, S., S Chaudhuri and G. Das, "DBXplorer: Enabling Keyword Search over Relational Databases", Proceedings of the 2002 ACM SIGMOD International Conference on Management of Data, 2002, p. 627.
Bhalotia, G., A. Hulgeri, C Nakhe, S. Chakrabarti and S. Sudarshan, "Keyword Searching and Browsing in Databases Using Banks", Proceedings of the 18th International Conference on Data Engineering, 2002, 10 pp.
Brin, S. and L. Page, "The Anatomy of a Large-Scale Hypertextual Web Search Engine", Computer Networks and ISDN Systems, vol. 30, No. 1-7, 1998, pp. 107-117.
Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, pp. 426-434.
Broder, A.Z., S.C. Glassman, M.S. Manasse, and G. Zweig, "Syntactic Clustering of the Web", Computer Networks and ISDN Systems, vol. 29, Iss. 8-13, 1997, pp. 1157-1166.
Bruno, N., K. Koudas and D. Srivastava, "Holistic Twig Joins: Optimal XML Pattern Matching", Proceedings of the 2002 ACM SIGMOD International Conference on Management of Data, 2002, pp. 310-321.
Carmel, D., Y. Maarek, M. Mandelbrod, Y. Mass and A. Soffer, "Searching XML Documents via XML Fragments," Proceedings of the 26th Annual International ACM SIGIR Conference on Research and Development in Information Retrieval, 2003, pp. 151-158.
Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, pp. 1158-1169.
French, G., "Hacking the Google Numrange Operator", [online], Apr. 1, 2004, [retrieved on Aug. 31, 2004], retrieved from the Internet at <URL: http://www.webpronews.com/insiderreports/search-insider/wpn-49-20040401HackingtheGoogleNumrangeOperator.html>.

(56) References Cited

OTHER PUBLICATIONS

Google, "Advanced Search", [online], 2003, [retrieved on Aug. 31, 2004], retrieved from the Internet at <URL: http://www.google.com/help/refinesearch.html>.

Gravano, L., P.G. Ipeirotis, N. Koudas and D. Srivastava, "Text Joins in an RDBMS for Web Data Integration", Proceedings of the 12th International Conference on World Wide Web, 2003, pp. 90-101.

Guttman, A., "R-Trees: A Dynamic Index Structure for Spatial Searching", Proceedings of the 1984 ACM SIGMOD International Conference on Management of Data, 1984, pp. 47-57.

Hristidis, V. and Y. Papakonstantinou, "DISCOVER: Keyword Search in Relational Databases", Proceedings of the 28th VLDB Conference, 2002, 12 pp.

Kaushik, R., R. Krishnamurthy, J.F. Naughton and R. Ramakrishnan, "On the Integration of Structure Indexes and Inverted Lists," Proceedings of the 20th International Conference on Data Engineering, 2004, 1 pg.

Melnik, S., S. Raghavan, B. Yang and H. Garcia-Molina, "Building a Distributed Full-Text Index for the Web," ACM Transactions on Information Systems, vol. 19, No. 3, Jul. 2001, pp. 217-241.

Press, W.H., B.P. Flannery, S.A. Teukolsky and W.T. Vetterling, "Numerical Recipes in C: The Art of Scientific Computing", 1998, Ch. 9, pp. 258-263.

Raghavan, S. and H. Garcia-Molina, "Complex Queries over Web Repositories", Proceedings of the 29th VLDB Conference, 2003, pp. 33-44.

Raghavan, S. and H. Garcia-Molina, "Integrating Diverse Information Management Systems: A Brief Survey", IEEE Data Engineering Bulletin, 2001, vol. 24, No. 4, pp. 44-52.

Ramsak, F., V. Markl, R. Fenk, M. Zirkel, K. Elhardt and R. Bayer, "Integrating the UB-Tree into a Database System Kernel", Proceedings of 26th International Conference on Very Large Data Bases, Sep. 2000, pp. 263-272.

Spertus, E. and L.A. Stein, "Squeal: A Structured Query Language for the Web", Proceedings of the 9th international World Wide Web Conference on Computer Networks, 2000, pp. 95-103.

Witten, I.H., A. Moffat, and T.C. Bell, "Managing Gigabytes: Compressing and Indexing Documents and Images", San Francisco: Morgan Kaufmann Publishers, 1999, Chapter 5, pp. 223-261.

Zobel, J., S. Heinz, and H.E. Williams, "In-Memory Hash Tables for Accumulating Text Vocabularies", Information Processing Letters, vol. 80, Iss. 6, 2001, pp. 271-277.

Lomet, D. (Ed.), "Bulletin of the Technical Committee on Data Engineering", Dec. 2001, vol. 24, No. 4, 56 pp.

Lu, W, L. Chien, & H. Lee, "Anchor Text Mining for Translation of Web Queries", Proceedings of First IEEE International Conference on Data Mining, Nov. 2001, pp. 401-408.

PCT International Search Report and Written Opinion, May 6, 2005, for International Application No. PCT/EP2005/050321.

PCT International Search Report and Written Opinion, Oct. 30, 2006, for International Application No. PCT/EP2006/064281.

Lu, Z., "Scalable Distributed Architectures for Information Retrieval", Dissertation, May 1999, Department of Computer Science, University of Massachusetts Amherst, 194 pp.

Tomasic, A. and H. Garcia-Molina, "Performance of Inverted Indices in Shared-Nothing Distributed Text Document Information Retrieval Systems", Proceedings of the Second International Conference on Parallel and Distributed Information Systems, 1993, Total 11 pp.

Agarwal, R.C. "A Super Scalar Sort Algorithm for RISC Processors", Proceedings of the 1996 ACM SIGMOD International Conference on Management of Data, 1996, pp. 240-246.

Arpaci-Dusseau, A.C., R.H. Arpaci-Dusseau, D.E. Culler, J.M. Hellerstein, and D.A. Patterson, "High Performance Sorting on Networks of Workstations", Proceedings of the 1996 ACM SIGMOD International Conference on Management of Data, 1997, 12 pp.

Baeza-Yates, R. and B. Ribeiro-Neto, "Modern Information Retrieval", England: Pearson Education Limited, 1999, Ch. 8 & Ch. 13, 29 pp.

IDS Report, Aug. 27, 2010, from the Aug. 10, 2010 Office Action for SVL920030117JP1, Total 3 pp.

Brown, E., "Execution Performance Issues in Full-Text Information Retrieval", Technical Report 95-81, Oct. 1995, 179 pp.

Brown, E., J.P. Callan, and W.B. Croft, "Fast Incremental Indexing for Full-Text Information Retrieval", Proceedings of the 20th International Conference on Very Large Data Bases, 1994, pp. 192-202.

Callan, J.P., W.B. Croft, and S.M. Harding, "The Inquery Retrieval System", Proceedings of the 3rd International Conference on Database and Expert Systems Applications, 1992, pp. 78-83.

Clarke, C.L.A., G.V. Cormack, and F.J. Burkowski, "Shortest Substring Ranking (MultiText Experiments for TREC-4)", Proceedings of the Fourth Text Retrieval Conference, Nov. 1995, pp. 1-10.

Corme, T.H., C.E. Leiserso, R.L. Rives, and C. Stei, "Introduction to Algorithms", Cambridge: The MIT Press, Second Edition, 2003, Chapter 8, 22 pp.

Dieberger, A. and D.M. Russell, "Context Lenses—Document Visualization and Navigation Tools for Rapid Access to Detail", Human-Computer Interaction Interact '01, Jul. 2001, pp. 545-552.

Hardman, L. "Links in Hypermedia: the Requirement for Context", Proceedings of the 5th ACM Conference on Hypertext, Nov. 1993, pp. 183-191.

Kaindl. H., S. Kramer, and L.M. Afonso, "Combining Structure Search and Content Search for the World-Wide Web," Proceedings of the 9TH ACM Conference on Hypertext and Hypermedia, 1998, pp. 217-224.

Lim, L., M. Wang, S. Padmanabhan, J.S. Vitter, and R. Agarwal, "Dynamic Maintenance of Web Indexes Using Landmarks", Proceedings of the 12th International Conference on World Wide Web, 2003, pp. 102-111.

Long, X and T. Suel. "Optimized Query Execution in Large Search Engines with Global Page Ordering", Proceedings of the 29th VLDB Conference, 2003, 12 pp.

Macurious Software Foundation, "Macurious Spider Frequently Asked Questions 3.0", [online] [retrieved on Oct. 8, 2003], retrieved from the Internet at <URL: http://www.macurious.com/spider/faq.htm>.

Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: micorsoft.public.frontpage.client; Date: Mar. 18, 1999 [3 entries] and Mar. 19, 1999 and (4) Newsgroups:alt.internet.search-engines; Date: Jan. 26, 2002, 3 pp.

Pearson, P.K., "Fast Hashing of Variable Length Text Strings", Communications of the ACM, Jun. 1990, vol. 33, No. 6, pp. 677-680.

Sedgewick, R., "Algorithms in C++. Parts 1-4." Boston: Addison-Wesley Publishing Co., 1998, Chapter 10, pp. 417-433 & 436-450.

Weinreich, H., H. Obendorf, and W. Lamersdorf, "The Look of the Link—Concepts for the User Interface of Extended Hyperlinks", Proceedings of the 12th ACM Conference on Hypertext and Hypermedia, 2001, pp. 19-28.

English Abstract for JP9311870, published on Dec. 2, 1997, 1 p [has English counterparts EP0809197 & US5848407 discussed in Remarks submitted with this IDS].

Tomasic, A., H. Garcia-Molina, and K. Shoens, "Incremental Updates of Inverted Lists for Text Document Retrieval", Nov. 18, 1993, Department of Computer Science, Stanford University, Total 43 pp.

Abstract and Machine Translation for JP2002163276, published on Jun. 7, 2002, 31 pp.

Lee, J.K., S.J. Upadhyaya, H.R. Rao, & R. Sharman, "Secure Knowledge Management and the Semantic Web", Dec. 2005, vol. 48, No. 12, Communication of the ACM, 7 pp.

EP Office Action, Jun. 16, 2009, for EP Application No. 06777790.4-1245, 3 pp.

Office Action 1, Jul. 31, 2009, for Application No. CN2006800253422, 6 pp.

Office Action 1, Jul. 31, 2009, for Application No. CN2006800253422, 2 pp. [Translation].

Shieh, W., Chen, T., and C. Chung, "A Tree-based Inverted File for Fast Ranked-Document Retrieval", Proceedings of the International Conference on Information and Knowledge Engineering, 2003, 6 pp.

Silvestri, F., S. Orlando, and R. Perego, "Assigning Identifiers to Documents to Enhance the Clustering Property of Fulltext Indexes", ACM 2004, Total 8 pp.

(56) References Cited

OTHER PUBLICATIONS

Silvestri, F., "High Performance Issues in Web Search Engines: Algorithms and Techniques", May 2004, Total 111 pp.

Suzaki, S. and T. Muramoto, "A New Decision Factor for IR System Extracted from Structure of Hypertexts" Jul. 16, 1999, English abstract begins on line 17, Total 9 pp.

EP Office Action, Feb. 2, 2012, for EP Application No. 06777790.4-1243, Total 5 pp.

Notice of Allowance 1, Jan. 19, 2012, for U.S. Appl. No. 12/187,344, filed Aug. 6, 2008 by M.F. Fontoura et al., Total 11 pp.

Notice of Allowability 1, Feb. 12, 2012, for U.S. Appl. No. 12/187,344, filed Aug. 6, 2008 by M.F. Fontoura et al., Total 13 pp.

Notice to File Corrected Application Papers, Jan. 5, 2012, for U.S. Appl. No. 12/190,495, filed Aug. 12, 2008 by M.F. Fontoura et al., Total 3 pp.

Response to Notice to File Corrected Application Papers, Jan. 17, 2012, for U.S. Appl. No. 12/190,495, filed Aug. 12, 2008 by M.F. Fontoura et al., Total 2 pp.

Notice of Allowance 12, Nov. 28, 2012, for U.S. Appl. No. 11/182,334, filed Jul. 14, 2005 by M.F. Fontoura et al., Total 13 pp.

\* cited by examiner

SEARCHING DOCUMENTS FOR RANGES OF NUMERIC VALUES

RELATED APPLICATIONS

This patent application is a continuation of U.S. patent application Ser. No. 12/190,495, filed on Aug. 12, 2008 now U.S. Pat. No. 8,271,498, which is a continuation of U.S. patent application Ser. No. 10/949,473, filed on Sep. 24, 2004 and issued as U.S. Pat. No. 7,461,064 on Dec. 2, 2008, which patent applications and patents are incorporated herein by reference in their entirety.

BACKGROUND OF THE INVENTION

1. Field of the Invention

The present invention relates to a method and article of manufacture for searching documents for ranges of numeric values.

2. Description of the Related Art

In the current art, a search engine, such as an Internet search engine, receives search request to locate all accessible documents, such as web pages, in a network, such as an Internet or Intranet, that satisfy a query. The search engine maintains posting lists for searchable words, terms, number, etc., where the posting list for a word comprises the document identifiers (docID) of all documents that include the word associated with the posting list. At periodic intervals, the search engine may execute web robots that search the Internet for documents. The robot determines the words in the document associated with posting lists and then adds the located document identifier, i.e., docID, to all posting lists associated with a word in the document.

When a user submits a request for multiple words, the search engine locates the posting lists for each word included in the search request and then returns the union of all document IDs in the posting lists if the search request is a Boolean OR search. If the search is an AND request, then the search engine returns the document IDs resulting from the intersection of the posting lists. Moreover, the query can also be an arbitrary expression, e.g. "A and B or C and not (D) and function (F, G).

SUMMARY

Provided are a method, system, and program for searching documents for ranges of numeric values. Document identifiers for documents are accessed, wherein the documents include at least one value that is a member of a set of values. A number of posting lists are generated. Each posting list is associated with a range of consecutive values within the set of values and includes document identifiers for documents having values within the range of consecutive values associated with the posting list. Each document identifier is associated with one value in the set of values included in the document identified by the document identifier. The generated posting lists are stored.

In further embodiments, document identifiers for documents are accessed, including at least one value that is a member of a set of values. A number of posting lists associated with a first level are generated, wherein each posting list is associated with a range of consecutive values within the set of values and includes document identifiers for documents having values within the range of consecutive values associated with the posting list. Each document identifier is associated with one value in the set of values included in the document identified by the document identifier. At least one iteration of generating posting lists for an additional level is performed, wherein each posting list generated for the additional level is formed by merging at least two posting lists associated with a previous level. Each generated posting list at one additional level is associated with consecutive values in the set of values. A new additional level and posting lists associated therewith are generated with each iteration.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
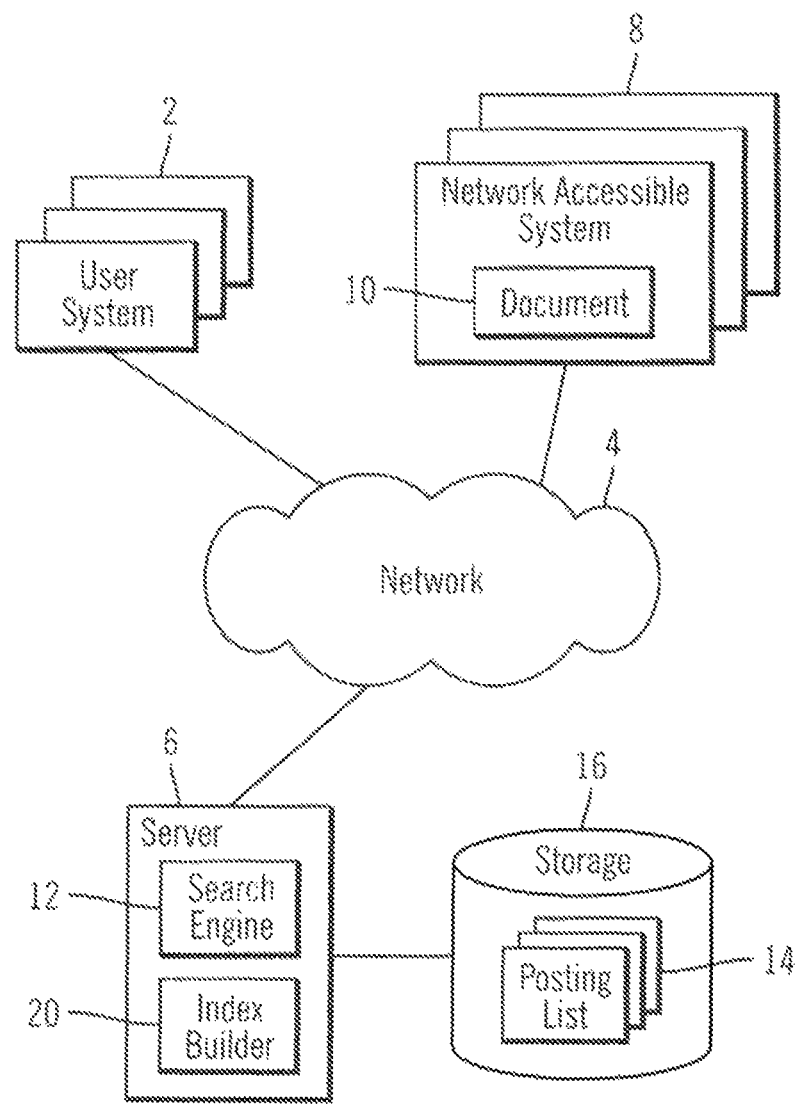
FIG. 1 illustrates an embodiment of a network computing environment.

FIG. 1 illustrates a network computing environment having a plurality of user systems 2 that may submit queries over a network 4 to a server 6 to search network accessible systems 8 for documents 10 that satisfy the query predicates. The server 6 includes a search engine 12 to receive, execute, and return results for user 2 search queries. The search engine 12 maintains a plurality of posting lists 14 in storage 16. Each posting list 14 includes document identifiers, such as a network address or document identifier, e.g., Uniform Resource Locator (URL), docID, etc., of documents 10 that include the term, i.e., word, number, etc., associated with that posting list 14. The term associated with a posting list may comprise a word or combination of words on which users search. In the described embodiments, the posting lists 14 include posting lists associated with numbers, where a posting list 14 may be associated with a single number or a range of numeric values.

The server 6 further includes an index builder 20 that builds the posting lists 14 used by the search engine 12 to execute queries received from the user systems 2.

Figure 2:
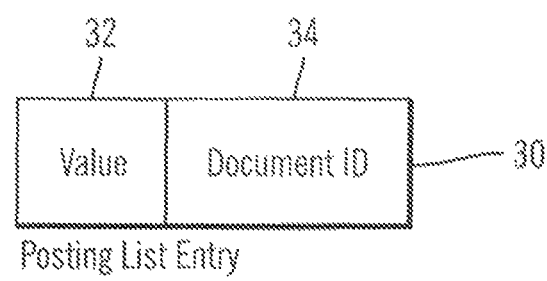
FIG. 2 illustrates an embodiment of information maintained in a posting list.

FIG. 2 illustrates information maintained with each entry 30 in a posting list 14. Each entry indicates a value 32 and a document identifier 34, e.g., network address, docID, etc., identifying a document 10 in one network accessible system 8 including the value 32. The value 32 may comprise a numeric value or token or some other payload, such as an arbitrary field, i.e., the document rank or its URL. Further, the payload can be empty (no value). A document identifier 34 may be included in posting list entries 30 in different posting lists 14 associated with values or terms included in the document 10.

The user systems 2 may comprise any computing device capable of submitting queries, i.e., search requests, to the server 6, including desktop computers, notebook computers, workstations, hand held computers, servers, mainframes, telephony devices, etc. The user systems 2 includes a browser program (not shown), such as a Hypertext Markup Language (HTML) web browser, capable of requesting and accessing documents 10 at network accessible systems 8 and submitting search requests to the server 6. The network 4 may comprise one or more networks known in the art, such as a Wide Area Network (WAN), Local Area Network (LAN), Storage Area Network (SAN), wireless network, the Internet, and Intranet, etc. The server 6 may comprise one or more computational machines, such as one or more servers, suitable for handling search requests from the user systems 2. The number of servers used for the server 6 depends on the anticipated network traffic from user systems 2.

The network accessible system 8 comprises any computational device or storage system capable of storing documents 10 and making such documents available to the user systems 2 and server 6 over the network 4. The network accessible systems 8 includes a program to respond to document requests from the user systems 2 and server 6 over the network 4, such as a Hypertext Transfer Protocol (HTTP), File Transfer Protocol (FTP), Network File System (NFS), etc. Certain network systems may function as both a user system 2 and network accessible system 8 serving documents 10. The documents 10 may be implemented in different computer readable formats, e.g., text, HTML, images, video, sound, Portable Document Format (PDF), and include searchable text or searchable metadata that the server 6 may access to index the documents 10 in the posting lists 14. The search engine 12 may periodically search for and access documents 10 in the network accessible systems 8, i.e., crawl the network 4, and determine whether the content of an accessed the document 10, in the body, metadata or header of the document 10, includes a term or numeric value that is associated with one of the posting lists. Document identifiers identifying documents having a term or value associated with a posting list 14 are added as an entry 30 (FIG. 2) to the associated posting list 14.

The server 6 includes a search engine 12 program. The search engine 12 includes a crawler, an indexer (shown as index builder 20) and a search server. The crawler collects documents from the network. The indexer extracts the searchable terms, including numeric values, from the documents and builds posting lists. The search server uses the posting lists to generate search results for the user's queries. The index builder 20 component of the search engine 6 generates the posting lists 14 that the search engine 12 queries to determine document identifiers identifying documents that satisfy the search request parameters, which may include a numeric range, words, text, etc. The numeric range may comprise price, date, etc.

Figure 3:
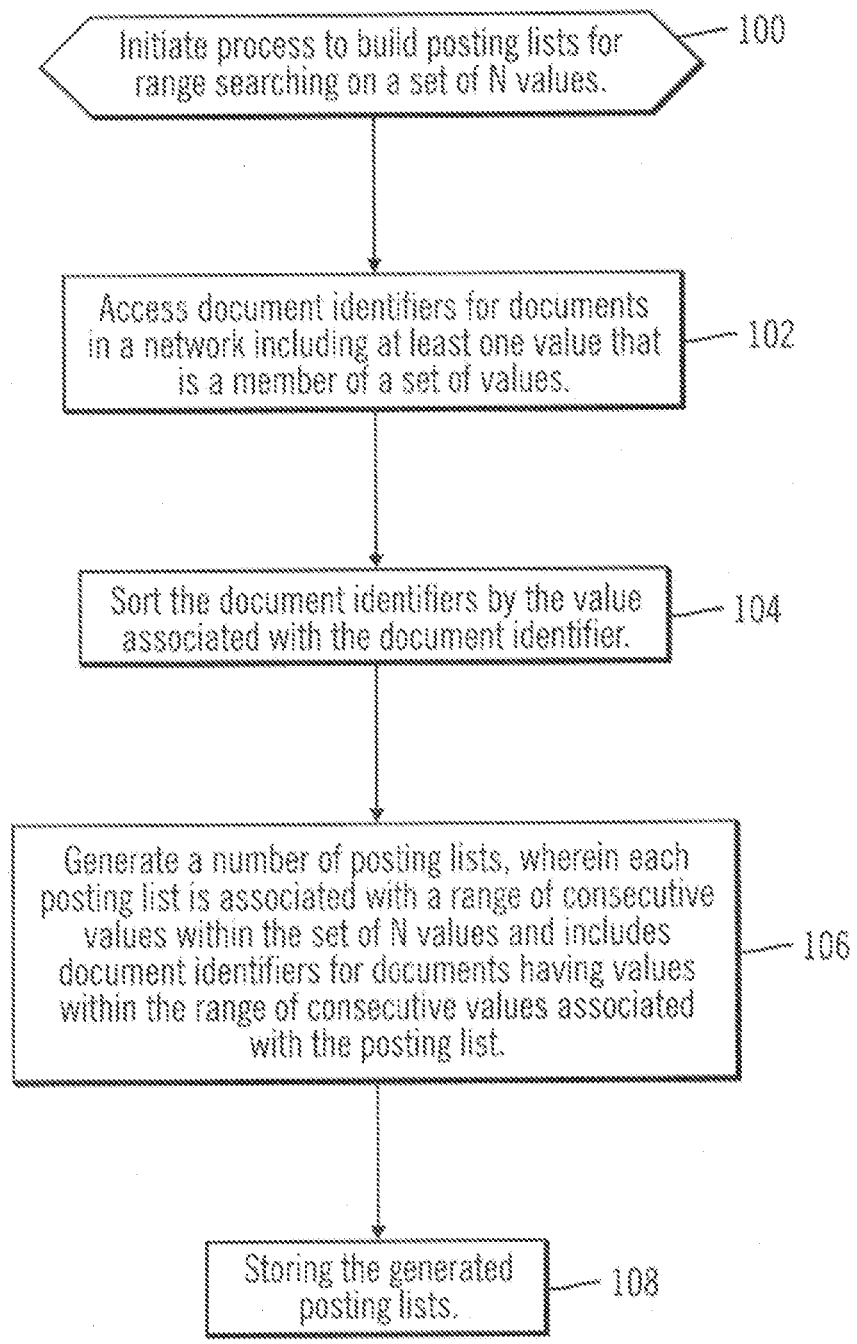
FIGS. 3 and 6 illustrate embodiments of operations to generate posting lists.

FIG. 3 illustrates an embodiment of operations performed by the index builder 20 to construct posting lists 14 to enable searching for a numeric value within a specified search range. The process is initiated (at block 100) to build posting lists 14 to allow searching on a set of N numeric values. The set of N values may comprise a range of consecutive values, comprising integers and/or real numbers. In one embodiment, when starting the indexing process, N may not be known. In such embodiment, during the indexing process (parsing and tokenization phase), the documents are scanned and the numeric values are extracted. These extracted numeric values determine the value of N and the indexing phase continues based on this determined value of N. The index builder 20 accesses (at block 102) document identifiers 34 for documents 10 in the network 4 including at least one value that is a member of a set of values. The index builder 20 may access posting lists 14 each associated with one value in the set of values to determine the document identifiers 32 of documents 10 that include a value in the range of values. The document identifiers 34 and value 32 pairs, or posting list entries 30, are sorted (at block 104) according to the document identifier 34 associated with the pair, i.e., posting list entry 30. The index builder 20 generates (at block 106) a number of posting lists 14 such that each posting list 14 is associated with a range of consecutive values within the set of N values and includes document identifiers 34 for documents 10 having values within the range of consecutive values associated with the posting list. In one embodiment, the values in different posting lists 14 may overlap. In such case, the query-time algorithm chooses a set of posting lists that include disjoint sets of values.

In one embodiment, the posting lists 14 may be associated with a range of consecutive values determined by dividing the number of values (N) by the number of posting lists, so that the N values in the set are equally distributed among the posting lists 14. The generated posting lists 14 include entries 30 having document identifiers 34 for documents 10 that include a value within the range of values associated with the posting list. Multiple entries in one generated posting list 14 may have the same document identifier 34 if the document identified by the document identifier 34 includes multiple values in the range of values associated with the generated posting list 14. The generated posting lists 14 are then stored (at block 108) in the storage 16.

Figure 4:
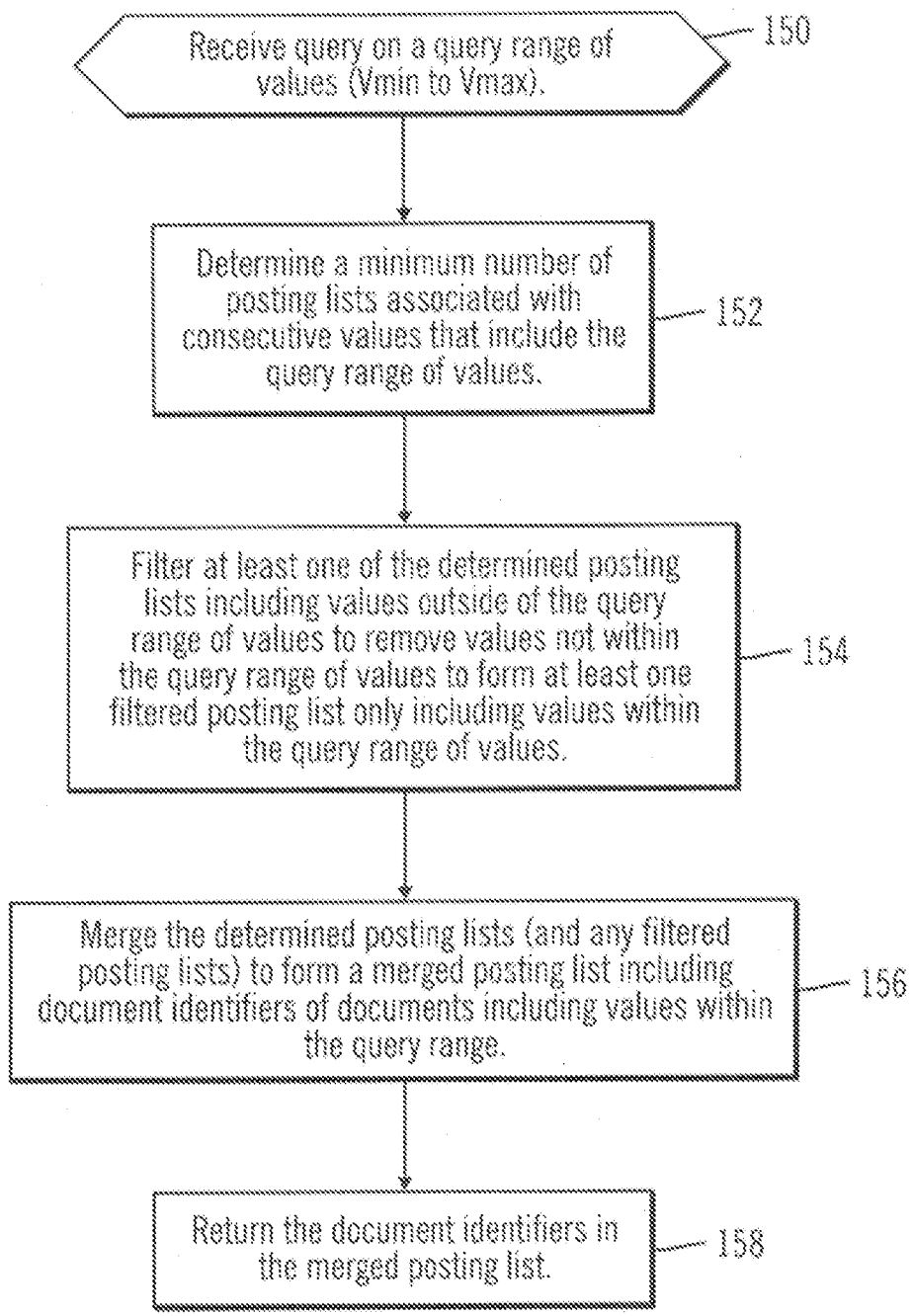
FIGS. 4, 5, and 7 illustrate embodiments of operations to execute a query using the posting lists.

FIG. 4 illustrates operations performed by the search engine 12 to execute a search request on a range of values using the posting lists 14 generated using the operations of FIG. 3. The search engine 12 receives (at block 150) a query on a query range of values ($V_{min}$ to $V_{max}$) from one of the user systems 2. The query may also include query terms on other predicates, such as words, terms, phrases, numbers, etc. The search engine 14 determines (at block 152) a minimum number of posting lists 14 associated with consecutive values that include the query range of values. Thus, the search engine 12 selects a minimum number of one or two posting lists 14 that span the query range. In one embodiment, there may be a filtering restriction limiting the number of filtering operations that may be performed on a selected minimum number of posting lists. In such case, the search engine 14 selects a greater number of smaller lists that span the query range of values but that contain fewer values outside of the query range that need filtering in order to satisfy the filtering restriction. The determined posting lists 14 including the maximum ($V_{max}$) and minimum ($V_{min}$) values in the query range may also have values that fall outside of the query range. In such case, the search engine 12 filters (at block 154) at least one of the determined posting lists 14 including values outside of the query range of values to remove values not within the query range of values to form at least one filtered posting list only including values within the query range of values. In one embodiment, zero or no more than two posting lists will be filtered, the one or two posting lists including the lowest and highest values of the range. The filtering is not performed if the posting lists 14 do not include any values outside of the query range. Thus, the posting lists 12 including the maximum and minimum values of the query range may be filtered to produce filtered posting lists only including values within the query range.

The search engine 12 then merges (at block 126) the determined posting lists, which may include filtered posting lists, to form a merged posting list including document identifiers 34 of documents 10 including values within the query range. The search engine 12 returns (at block 128) the document identifiers in the merged posting list to the user system 2 initiating the query. In returning the document identifiers, the search engine 12 may remove multiple instances of the document identifiers for different values within the range so that a document identifier is presented only once for all values in the range it may have. The document identifiers may be returned to the user system 2 in a web page or search report in a format known in the art. In certain embodiments, the document identifiers relevant to the numeric field are processed along with other query terms, most often words, to find documents relevant to the entire query. In this way, the numeric range querying can be used with free-text queries because queries often contain more than just a single numeric range.

Figure 5:
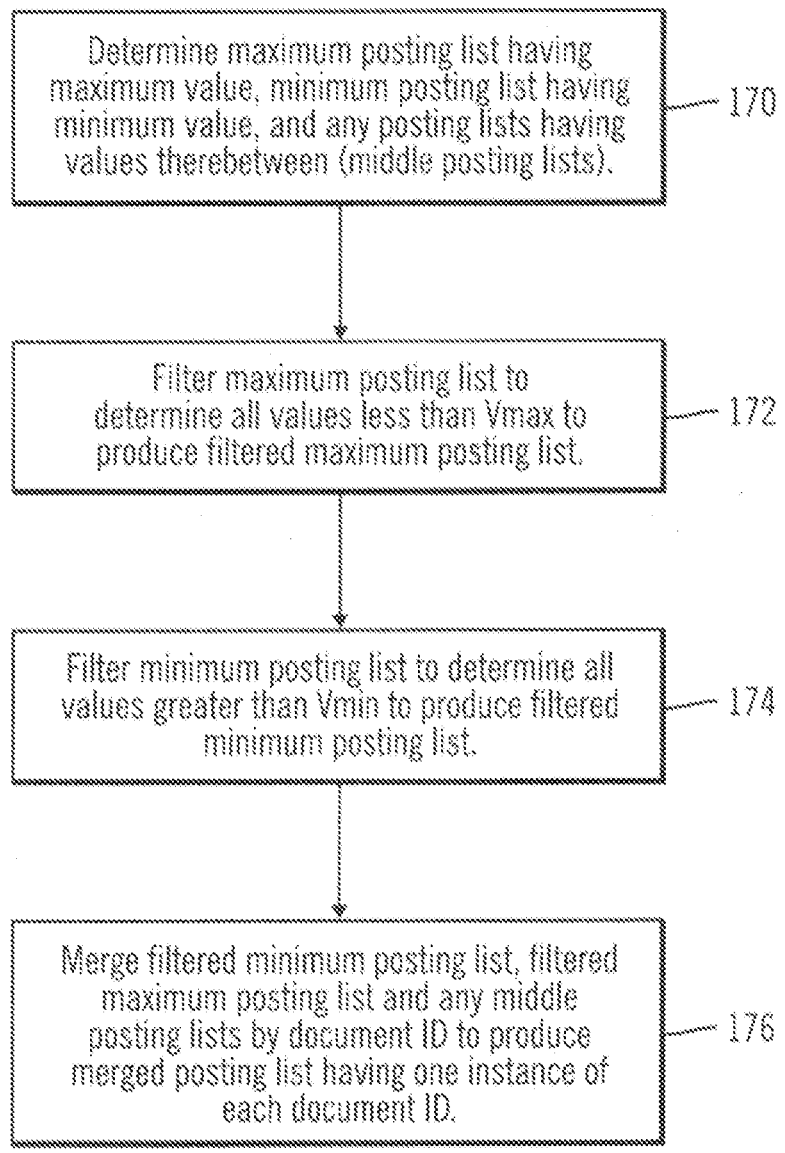

FIG. 5 illustrates one embodiment of operations the search engine performs to execute a search request from a user system 2 including a query range of numeric values. At block 170, the search engine 12 determines a maximum posting list having a maximum value in the query range ($V_{max}$), a minimum posting list having minimum value in the query range ($V_{min}$), and any posting lists having values therebetween (middle posting lists). The maximum posting list is filtered (at block 172) to determine all values less than $V_{max}$ to produce filtered maximum posting list having only those values less than $V_{max}$ that fall within the query range. The minimum posting list is filtered (at block 174) to determine all values greater than $V_{min}$ to produce a filtered minimum posting list having only those values greater than $V_{min}$ that fall within the query range. The search engine 12 then merges (at block 176) the filtered minimum posting list, filtered maximum posting list and any middle posting lists by document ID to produce merged posting list having one instance of each document ID.

Figure 6:
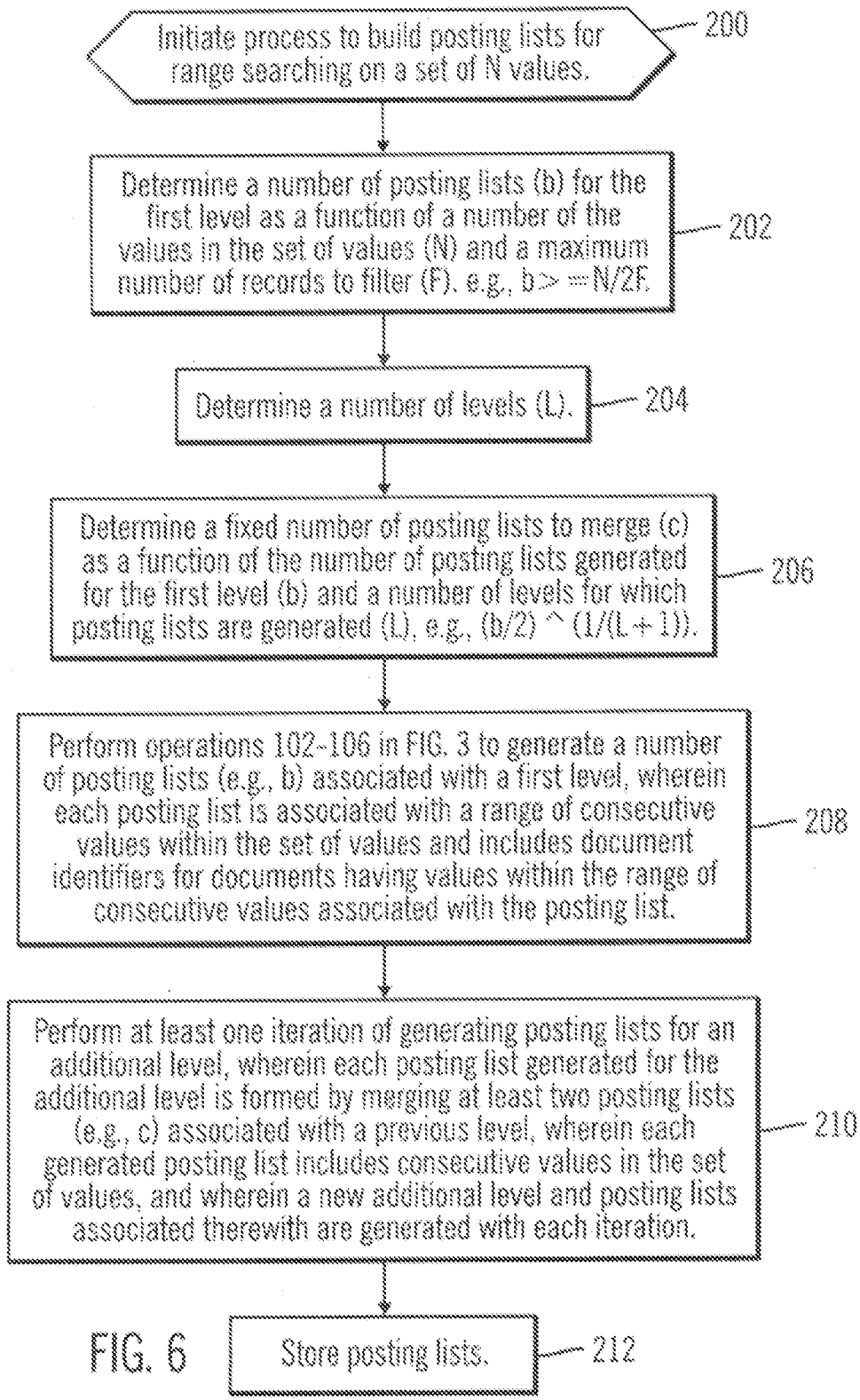

FIG. 6 illustrates an additional embodiment of the operations performed by the index builder 20 to construct the posting lists 14. Upon initiating (at block 200) a process to build posting lists for range searching on a set of N values, the index builder 20 determines (at block 202) a number (b) of posting lists 14 for the first level as a function of a number of the values in the set of values (N) and a maximum number of records to filter (F), e.g., b=N/2F. In one embodiment, the number (b) of posting lists may be required to be at least N/2F. The index builder 20 further determines (at block 204) a number of levels (L). The number of levels (L) may be determined as the number of posting lists the developer allows to be consulted using evaluation (more levels—less posting lists are needed). Further, the amount of storage space needed is a function of L, i.e., the storage space required by all the posting list entries 30 associated with values within the set of N values. The index builder 20 may further determine (at block 206) a fixed number of posting lists to merge (c) to obtain all entries that span the queried range, also known as a clustering factor, that is a function of the number of posting lists 14 generated for the first level (b), i.e., b/N, and a number of levels for which posting lists are generated (L). The function to determine the number of posting lists to merge at each level, e.g., the clustering factor (c) may be calculated according to equation (1) below:

$$\left(\frac{b}{2}\right)^{\frac{1}{L+1}} \qquad (1)$$

The index builder 20 then performs (at block 208) the operations at blocks 102-106 in FIG. 3 to generate a number of posting lists (e.g., b) associated with a first level. In alternative embodiments, any of the parameters, e.g., N, F, L, and b, used in calculating the number of posting lists to generate may be manually entered or determined based on empirical testing. Each posting list 14 is associated with a range of consecutive values within the set of values and includes document identifiers 34 for documents 10 having values within the range of consecutive values associated with the posting list.

The index builder 20 performs (at block 210) one or more iterations of generating posting lists associated with an additional level. Each posting list associated with the additional level is formed by merging at least two posting lists associated with a previous level. Each generated posting list includes consecutive values within the set of values. In one embodiment, posting lists may be generated for the L levels, where L may be calculated according to the operations in block 204. Further, the number of posting lists merged to form a posting list for an additional level following the first level may comprise the clustering factor (c) calculated according to the operations in block 206. At each increasing additional level, the number of posting lists formed for that level decreases by a factor of the clustering factor (c). The posting lists 14 for all the different levels, from one to L, are stored in storage 16 (at block 212).

Figure 7:
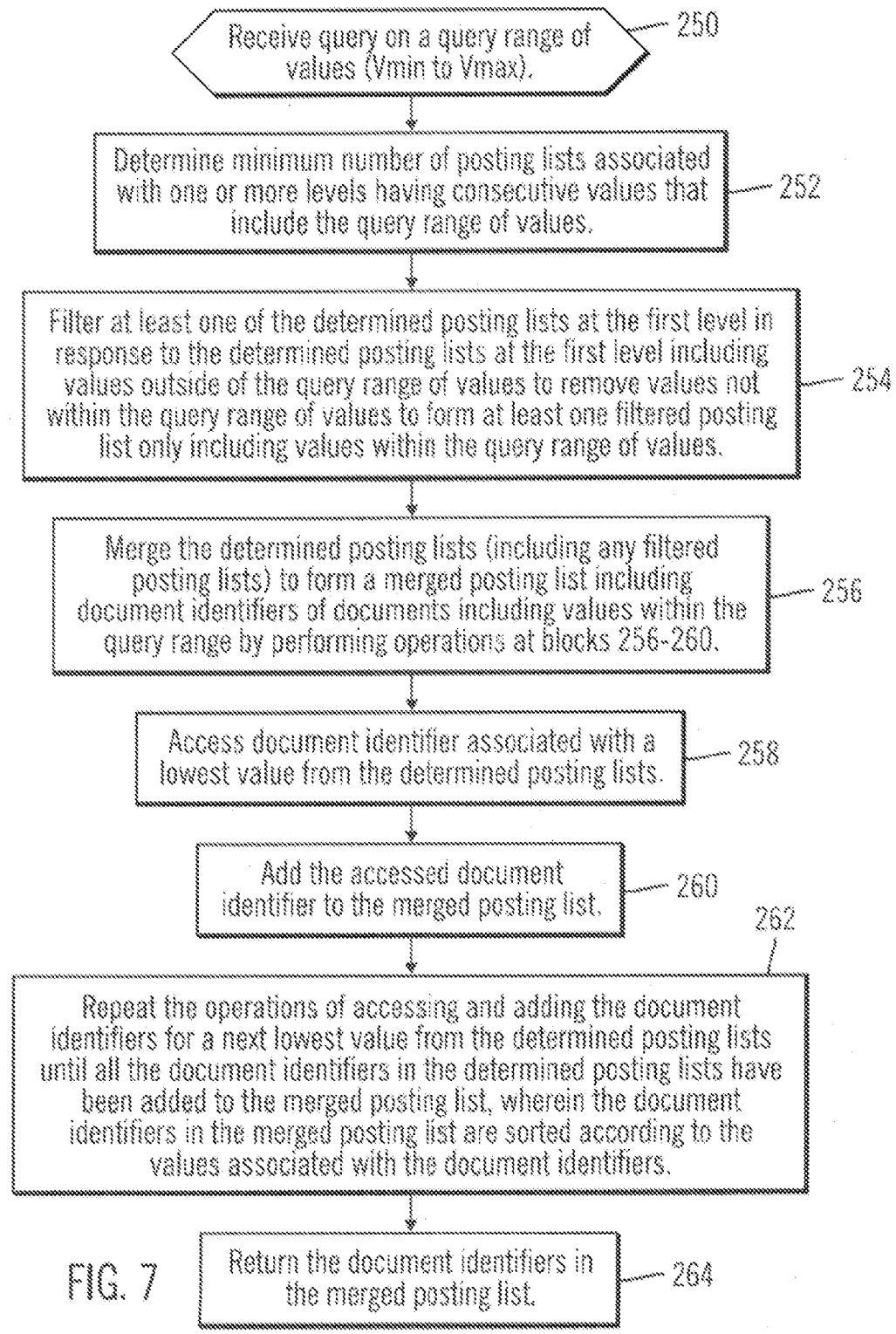

FIG. 7 illustrates one embodiment of operations the search engine 12 performs to execute a search request from a user system 2 including a query range of numeric values. At block 250, the search engine 12 receives a query on a query range of values ($V_{min}$ to $V_{max}$). The query may also include query terms on other predicates, such as words, terms, phrases, numbers, etc. The search engine 12 determines (at block 252) a minimum number of posting lists 14 associated with one or more levels having consecutive values that include the query range of values. In determining the minimum number of posting lists 14, the search engine 12 may first determine posting lists of consecutive values at a highest level, i.e., having a greatest range of values that are completely included in the query range. The values in the query range that fall outside of the ranges defined by the determined posting list at the highest level comprise one or more residual ranges. The search engine would then move to a next lower level of posting lists having a smaller range than the previously considered level to locate posting lists that fall completely within any of the residual ranges. This process of determining residual ranges and looking at the next lower level to find smaller posting lists that fit within any residual ranges would continue up until there are no more residual ranges or to the first level, where a selected posting list at the first level would have a minimum number of values outside of the query range. The minimum number of posting lists may also be selected to minimize filtering. Further, the minimum number of posting lists may be selected in different orders or using different algorithms than described above.

The search engine 12 filters (at block 254) at least one of the determined posting lists at the first level if the determined posting lists at the first level include values outside of the query range of values. In one embodiment, the number of determined posting lists may be just one or two. This filtering removes values from the posting lists at the first level that are not within the query range of values to form at least one filtered posting list only including values within the query range of values. In one embodiment, this search engine 12 may perform the operations in FIG. 5 to filter posting lists at the first level including values outside of the first range. The filtering operation is not performed if any determined posting lists (if there are any) at the first level are not associated with values outside of the query range. The search engine then merges (at block 256) the determined posting lists (including any filtered posting lists) to form a merged posting list including document identifiers of documents including values within the query range. The merging operation may be implemented by performing the operations at blocks 258-262. At block 258, the search engine 12 accesses a document identifier 34 associated with a lowest value from the determined posting lists 14 encompassing the query range. The accessed document identifier is added (at block 260) to the merged posting list being formed. The search engine 12 repeats (at block 262) the operations of accessing and adding the document identifier 34 for a next lowest value 32 from the determined posting lists until all the document identifiers, which may be in posting list entry 30 format, in the determined posting lists have been added to the merged posting list being formed. The document identifiers in the merged posting list are sorted according to the values associated with the document identifiers. These document identifiers are then returned (at block 264) to the user system 2 initiating the query. This merging operation at blocks 258-262 may comprise a heap merge.

At certain intervals, the server 6 may update posting lists by crawling the web, i.e., accessing network accessible systems 8, for documents including values associated with posting lists 14 and then perform the operations in FIG. 3 or 6 to regenerate the posting lists 14 having ranges of values to use for queries on ranges of values. In this way, the posting lists having the ranges of values to search on are regenerated at regular intervals to include newly located documents.

Figure 8:
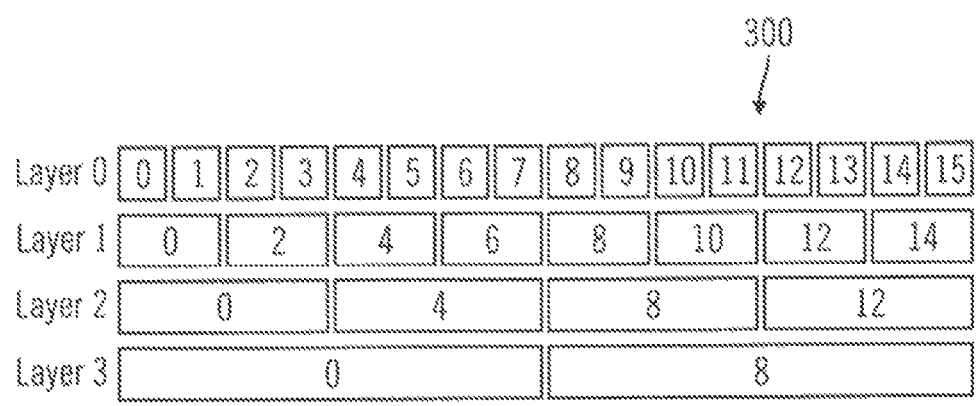
FIG. 8 illustrates an example of posting lists at different layers.

FIG. 8 illustrates an example of posting lists 300 at different layers 0-3, where layer 0 has posting lists 0-16. Layer 1 includes posting lists formed by merging each two consecutive posting lists, e.g., 0 and 1, 2 and 3, 4, and 5, etc. from the previous layer 0.

Likewise, Layer 2 includes posting lists formed by merging each two consecutive posting lists from the previous layer 1. The algorithm described above would perform a query of a range from 2-14 by selecting the minimum number of posting lists including this range, which would include layer 2 lists 4 and 8, layer 1 list 1, and layer 0 list 14.

The user systems 2 may submit queries that include both query ranges of numeric values as well as other query terms, such as words, terms, etc. In such case, when forming the merged posting lists, the search engine 12 may merge the merged posting list of the document identifiers associated with the query range of values with posting lists associated with other query terms, such as words, phrases, etc. If the query involved an OR operation of the terms and query range, then merging the posting lists for the query range involves forming a union of the document identifiers, e.g., document IDs of all determined posting lists. If the query involved an AND operation, then merging the posting lists for the query range involves determining an intersection of the document identifiers, e.g., document IDs, in all the determined posting lists.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

FIG. 1 shows the documents 10 as being network documents in a network accessible system. However, the described embodiments are also applicable to desktop search engines where no network access is needed for indexing documents. Furthermore, the search engines may be provided document identifiers and indexable payloads or values by an application other than crawl the crawler. Thus, the described embodiments may apply to searching any collection of documents, and is not limited to network documents.

The illustrated operations of FIGS. 3-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
   accessing document identifiers for documents;
   scanning the documents to determine values comprising searchable terms in the documents that are members of a set of values, wherein the set of values comprises at least one of an integer and a real number;
   generating a plurality of posting lists, wherein each posting list is associated with a range of consecutive values within the set of values, wherein at least two of the posting lists are associated with ranges of consecutive values in the set of values that differ by at least one value, and wherein each posting list includes at least one of the document identifiers for at least one of the documents including at least one of the values within the range of consecutive values associated with the posting list; and storing the generated posting lists, wherein the posting lists are used to process a query on a range of values within the set of values.

2. The method of claim 1, further comprising:

sorting the document identifiers and value pairs in each posting list by the document identifiers.

3. A computer implemented method, comprising:

accessing document identifiers for documents;

scanning the documents to determine values comprising searchable terms in the documents that are members of a set of values, wherein the set of values comprises at least one of an integer and a real number;

generating a number of posting lists associated with a first level, wherein each posting list is associated with a range of consecutive values within the set of values, wherein at least two of the posting lists are associated with ranges of consecutive values in the set of values that differ by at least one value, and wherein each posting list includes at least one of the document identifiers for at least one of the documents including at least one of the values within the range of consecutive values associated with the posting list; and performing at least one iteration of generating posting lists for an additional level, wherein each posting list generated for the additional level is formed by merging at least two posting lists associated with a previous level, wherein each generated posting list at one additional level is associated with consecutive values in the set of values, wherein each document in the generated posting list at the additional level includes one value in the consecutive values associated with the posting list at the additional level, and wherein a new additional level and posting lists associated therewith are generated with each iteration.

4. The method of claim 3, wherein the number of posting lists generated for the first level is a function of a number of the values in the set of values and a maximum number of records to filter in posting lists at the first level.

5. The method of claim 4, wherein the function comprises dividing the number of values in the set of values by two times the maximum number of records to filter.

6. The method of claim 3, wherein each posting list generated for one additional level is formed by merging a fixed number of posting lists associated with the previous level.

7. The method of claim 6, wherein the fixed number of posting lists is a function of the number of posting lists generated for the first level and a number of levels for which posting lists are generated.

8. The method of claim 3, wherein the additional iterations are performed to generate posting lists for a number of levels.

9. The method of claim 3, further comprising:

filtering at least one of the determined posting lists at the first level in response to the determined posting lists at the first level including values outside of the query range of values to remove values not within the query range of values to form at least one filtered posting list only including values within the query range of values, wherein merging the determined posting lists comprises merging the at least one filtered posting list and determined posting lists that are not subject to filtering.

10. The method of claim 9, wherein merging the determined posting lists comprises:

accessing at least one of the documents identifiers associated with a lowest value from the determined posting lists;

adding the accessed at least one of the document identifiers to the merged posting list; and repeating the operations of accessing and adding the document identifiers for a next lowest value from the determined posting lists until all the document identifiers in the determined posting lists have been added to the merged posting list, wherein the document identifiers in the merged posting list are sorted according to the values associated with the document identifiers.

11. A system, comprising:

a processor; and a computer readable medium including code executed by the processor to perform operations, the operations comprising:

accessing document identifiers for documents;

scanning the documents to determine values comprising searchable terms in the documents that are members of a set of values, wherein the set of values comprises at least one of an integer and a real number;

generating a plurality of posting lists, wherein each posting list is associated with a range of consecutive values within the set of values, wherein at least two of the posting lists are associated with ranges of consecutive values in the set of values that differ by at least one value, and wherein each posting list includes at least one of the document identifiers for at least one of the documents including at least one of the values within the range of consecutive values associated with the posting list; and storing the generated posting lists, wherein the posting lists are used to process a query on a range of values within the set of values.

12. The system of claim 11, wherein the operations further comprise:

sorting the document identifiers and value pairs in each posting list by the document identifiers.

13. An article of manufacture comprising at least one of a hardware device implementing logic and a computer storage media having computer executable code to cause operations to be performed, the operations comprising:

accessing document identifiers for documents;

scanning the documents to determine values comprising searchable terms in the documents that are members of a set of values, wherein the set of values comprises at least one of an integer and a real number;

generating a number of posting lists, wherein each posting list is associated with a range of consecutive values within the set of values, wherein at least two of the posting lists are associated with ranges of consecutive values in the set of values that differ by at least one value, and wherein each posting list includes at least one of the document identifiers for at least one of the documents including at least one of the values within the range of consecutive values associated with the posting list; and storing the generated posting lists, wherein the posting lists are used to process a query on a range of values within the set of values.

14. The article of manufacture of claim 12, wherein the operations further comprise:

sorting the document identifiers and value pairs in each posting list by the document identifiers.

15. The method of claim 1, wherein the at least two of the posting lists associated with the ranges of consecutive values that differ by at least one value have disjoint sets of values.

16. The method of claim 3, wherein the at least two of the posting lists associated with the ranges of consecutive values that differ by at least one value have disjoint sets of values.

17. The system of claim 11, wherein the at least two of the posting lists associated with the ranges of consecutive values that differ by at least one value have disjoint sets of values.

18. The article of manufacture of claim 13, wherein the at least two of the posting lists associated with the ranges of consecutive values that differ by at least one value have disjoint sets of values.

19. The method of claim 1, wherein the posting lists are associated with ranges of values such that the values in the set of values are distributed among the posting lists.

20. The method of claim 3, wherein the posting lists are associated with ranges of values such that the values in the set of values are distributed among the posting lists.

21. The system of claim 11, wherein the posting lists are associated with ranges of values such that the values in the set of values are distributed among the posting lists.

22. The article of manufacture of claim 13, wherein the posting lists are associated with ranges of values such that the values in the set of values are distributed among the posting lists.

* * * * *